United States Patent
Gretz (10) Patent No.: US 9,667,049 B1
(45) Date of Patent: May 30, 2017

(54) ELECTRICAL BOX ASSEMBLY FOR POURED CONCRETE FLOORS

(71) Applicant: Arlington Industries, Inc., Scranton, PA (US)

(72) Inventor: Thomas J. Gretz, Delray Beach, FL (US)

(73) Assignee: ARLINGTON INDUSTRIES, INC., Scranton, PA (US)

( * ) Notice: Subject to any disclaimer, the term of this patent is extended or adjusted under 35 U.S.C. 154(b) by 0 days.

(21) Appl. No.: 15/014,345

(22) Filed: Feb. 3, 2016

Related U.S. Application Data (60) Provisional application No. 62/112,673, filed on Feb. 6, 2015.

(51) Int. Cl.
- *H02G 3/18* (2006.01)
- *H02G 3/12* (2006.01)
- *H02G 3/08* (2006.01)
- *H02G 3/22* (2006.01)

(52) U.S. Cl.
CPC ............ *H02G 3/185* (2013.01); *H02G 3/081* (2013.01); *H02G 3/12* (2013.01); *H02G 3/22* (2013.01)

(58) Field of Classification Search
CPC .......... H02G 3/185; H02G 3/081; H02G 3/12; H02G 3/22
USPC ........................................................ 174/520
See application file for complete search history.

(56) References Cited

U.S. PATENT DOCUMENTS

| | | | |
|---|---|---|---|
| 5,272,278 A | 12/1993 | Wuertz | |
| 5,420,376 A * | 5/1995 | Rajecki | H02G 3/20 174/484 |
| 5,466,886 A | 11/1995 | Lengyel et al. | |
| 5,783,774 A | 7/1998 | Bowman et al. | |
| 6,179,634 B1 | 1/2001 | Hull et al. | |
| 7,795,544 B2 * | 9/2010 | Peck | H02G 3/185 174/480 |
| 8,273,998 B2 * | 9/2012 | Drane | H01R 24/78 174/482 |
| 8,759,676 B1 | 6/2014 | Gretz | |
| 8,921,712 B1 | 12/2014 | Gretz | |
| 2008/0011503 A1 * | 1/2008 | Dinh | H02G 3/14 174/53 |
| 2008/0160826 A1 * | 7/2008 | Lamoureux | H01R 27/02 439/535 |
| 2012/0044703 A1 * | 2/2012 | Wilson | F21S 8/026 362/365 |

(Continued)

*Primary Examiner* — Timothy Thompson
*Assistant Examiner* — Charles Pizzuto (57) ABSTRACT

An electrical box assembly for concrete pours. The electrical box assembly includes an electrical box with a sidewall defining an electrical enclosure and a leveling ring for accepting the mounting of an electrical component to the box. Mounting bosses within the electrical box extend longitudinally along the inner surface of the sidewall and facilitate a means for mounting the leveling ring to the electrical box. The leveling ring includes a flange that is adapted to overlap the top rim of the electrical box. Component attachment arms on the leveling ring enable mounting of an electrical component to the electrical box assembly. Cover attachment arms on the leveling ring facilitate mounting of an electrical cover to the electrical box assembly. The electrical box assembly eliminates the need for clips and adhesive for leveling an electrical component with respect to the surface of a concrete poured surface.

19 Claims, 8 Drawing Sheets

(56) References Cited

U.S. PATENT DOCUMENTS

| | | | | |
|---|---|---|---|---|
| 2013/0094124 A1* | 4/2013 | Yang | ............ | H01L 31/0485 |
| | | | | 361/600 |
| 2014/0295234 A1* | 10/2014 | Wen | ............ | H01M 2/1083 |
| | | | | 429/96 |
| 2015/0263497 A1* | 9/2015 | Korcz | ............ | H02G 3/086 |
| | | | | 220/3.3 |
| 2016/0315458 A1* | 10/2016 | Kamo | ............ | H05K 5/0221 |

* cited by examiner

ELECTRICAL BOX ASSEMBLY FOR POURED CONCRETE FLOORS

CROSS-REFERENCE TO RELATED APPLICATIONS

This application claims priority to provisional U.S. Application No. 62/112,673, filed Feb. 6, 2015, the contents of which are incorporated herein by reference in their entirety.

FIELD OF THE INVENTION

The present invention generally relates to electrical boxes, and specifically to an electrical box for mounting an electrical device in a poured concrete floor.

BACKGROUND OF THE INVENTION

A common desire in the pouring of concrete floors for basements, patios, and the like, is the installation of one or more electrical outlets in the concrete floor in order to provide electrical service in a given floor area. In order to meet this need, various electrical boxes have been proposed for concrete pours. These boxes are placed within the forms that will receive the concrete pour, the concrete is poured around the electrical box, and, after the concrete cures, an electrical component is mounted within the box.

One problem that commonly occurs when an electrical box is placed within the form area that will receive the concrete pour is the shifting of the orientation of the electrical box as a result of the heavy concrete mixture forcing the box out of the desired vertical plumb. In other cases, the concrete surface is purposely sloped and the concrete pour forces the electrical box out of alignment with the concrete surface. In either case, an adjustment must be made in order to mount the electrical component, such as a duplex receptacle, substantially level with the concrete surface.

Several electrical boxes have been proposed in order to compensate for the misalignment of an electrical box as a result of a concrete pour. Typically, these electrical boxes use a leveling ring that can be adjusted to align the electrical component with the level of the concrete. Two general types of leveling rings have been proposed, including those attached by clips within the electrical box and those secured to the box by adhesive. Both of these methods are cumbersome to implement. Installation of clips within an electrical box adds a degree of difficulty, as the installer must typically manipulate a plurality of clips, attaching one end of the clip within the electrical box and the opposing ends to the leveling ring to secure the ring to the box. Although attachment of leveling rings by adhesive has been proposed, it is messy as, instead of being confined to the ring, the adhesive typically spreads within the electrical box to other surfaces away from the ring. Additionally, if later readjustment of the ring is needed, use of adhesive makes it very difficult to readjust the position of the leveling ring.

What is needed therefore is an improved electrical box for concrete pours that enables secure mounting of an electrical device, enables mounting of a wide range of electrical covers, and that also eliminates the use of clips and adhesive. Furthermore, what is needed is an electrical box for concrete pours that provides the capability to mount both high and low voltage components in the same box.

BRIEF SUMMARY OF THE INVENTION

The present invention is an electrical box assembly for concrete pours. The electrical box assembly includes an electrical box with a sidewall defining an electrical enclosure and a leveling ring for accepting the mounting of an electrical component to the box. Mounting bosses within the electrical box extend longitudinally along the inner surface of the sidewall and facilitate a means for mounting the leveling ring to the electrical box. The leveling ring includes a flange that is adapted to overlap the top rim of the electrical box. Component attachment arms on the leveling ring enable mounting of an electrical component to the electrical box assembly. Cover attachment arms on the leveling ring facilitate mounting of an electrical cover to the electrical box assembly. The electrical box assembly eliminates the need for clips and adhesive for leveling an electrical component with respect to the surface of a concrete poured surface.

Objects and Advantages

A first object of the invention is to provide an electrical box assembly that eliminates the need for clips and adhesive for leveling an electrical component with respect to the surface of a concrete poured surface.

A second object of the invention is to provide an electrical box assembly that includes mounting bosses extending the vertical length of the box enclosure to enable any portion of the electrical box to be cut in order to bring the box rim level with the final poured surface.

A further object of the invention is to provide a leveling ring with a flange that overlaps or covers the underlying electrical box when secured thereto.

A further object of the invention is to provide an electrical box assembly that can be economically manufactured at low-cost.

Another object of the invention is to provide an electrical box assembly that will accept threaded plugs or flip lids covers to protect an electrical receptacle when not in use.

A further object of the invention is to provide a leveling ring with a flange that will enable it to easily adjust to a concrete surface.

A further object of the invention is to provide an electrical box assembly that is able to accept any flat cover.

Another object is to provide an electrical box with mounting bosses that are molded integrally with the box and can be cut with a saw.

These and other objects and advantages of the present invention will be better understood by reading the following description along with reference to the drawings.

BRIEF DESCRIPTION OF THE SEVERAL VIEWS OF THE DRAWING(S)

Reference is made herein to the accompanying drawings, which are not necessarily drawn to scale, and wherein.

DETAILED DESCRIPTION

Figure 1:
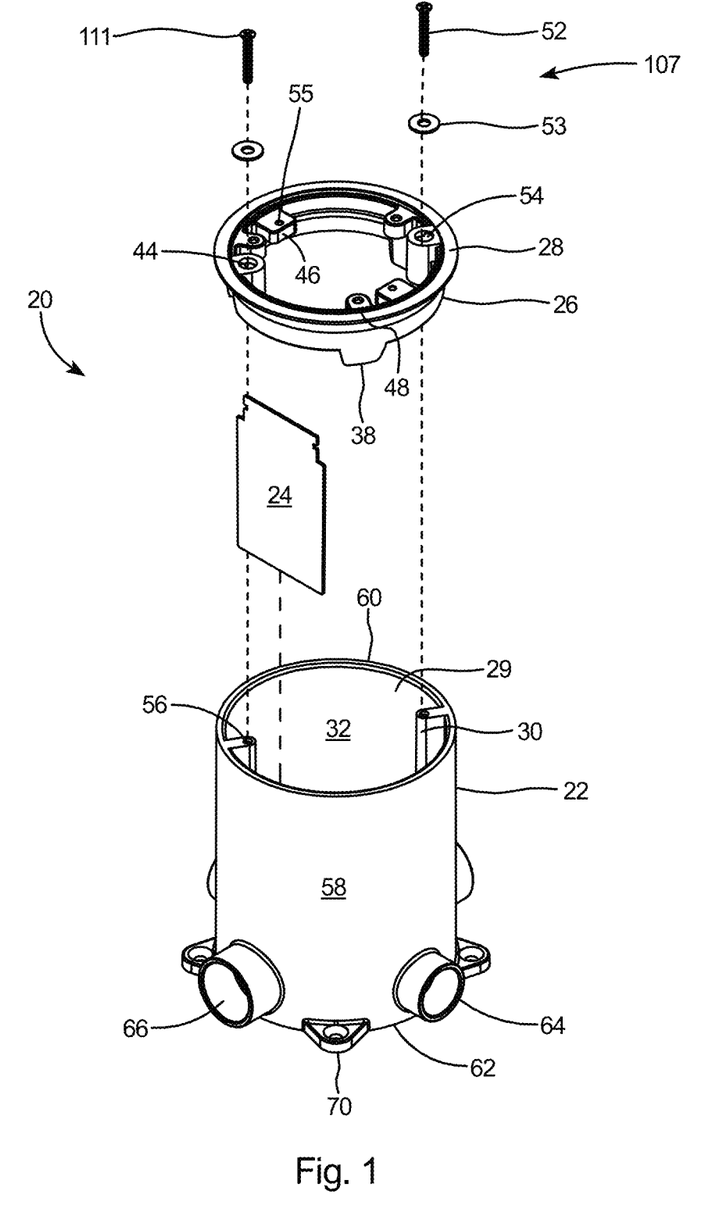
FIG. 1 is an exploded isometric view of an electrical box assembly for poured concrete floors, in accordance with embodiments of the invention.

With reference to FIG. 1, there is shown an electrical box assembly 20 for concrete pours according to the present invention. The electrical box assembly 20 includes an electrical box 22 and an optional slide member 24 for dividing the electrical box into low voltage and high voltage compartments. The electrical box assembly can be configured to mount a conventional electrical cover (not shown), including either a flat electrical cover or a conventional pop-up style electrical cover, to the electrical box 22. The electrical box assembly 20 further depicts a leveling ring 26 for installing an electrical component (not shown) and an electrical cover to the electrical box. For leveling an electrical component such as a duplex receptacle (not shown), with respect to the electrical box 22, the leveling ring 26 includes a flange 28 and the electrical box includes an electrical enclosure 29 and mounting bosses 30 extending along the entire vertical length of the inner surface 32 of the electrical box.

Figure 6:
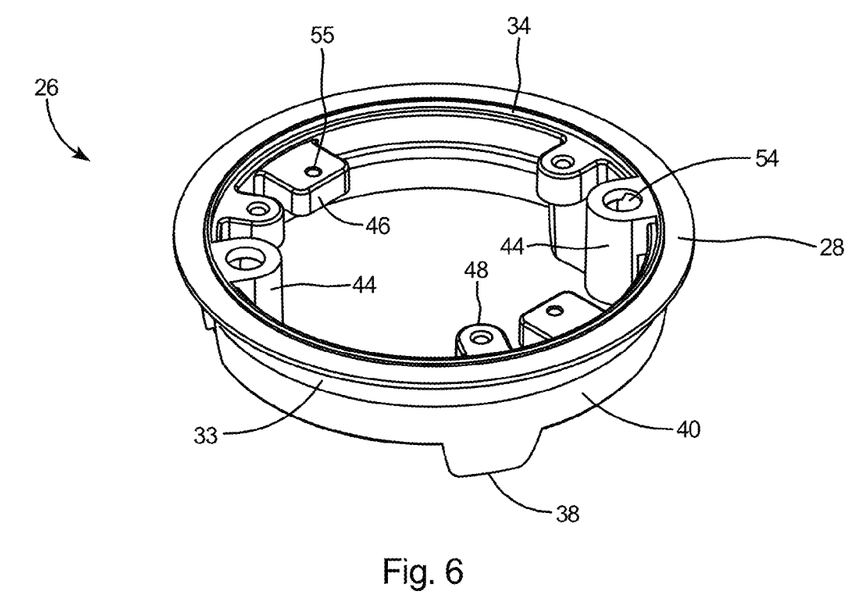
FIG. 6 is a top isometric view of a leveling ring that forms a portion of the electrical box assembly of FIG. 1.
Figure 7:
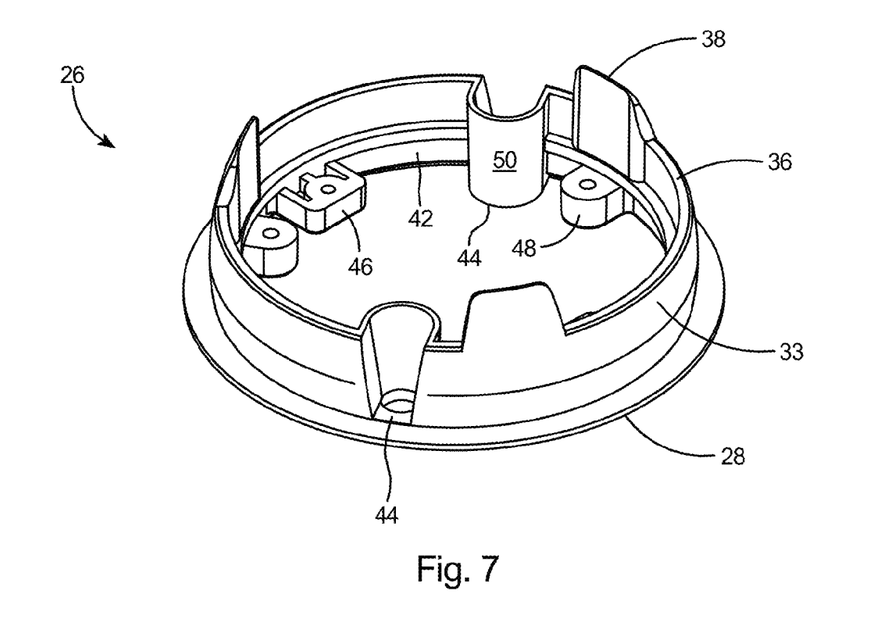
FIG. 7 is a bottom isometric view of the leveling ring.

Referring to FIGS. 6-7, the leveling ring 26 includes a ring body 33, a top surface 34, a lower surface 36, and at least one leg 38 extending downward from the lower surface 36. The leveling ring 26 further includes an outer periphery 40 and an inner periphery 42. The flange 28 extends from the outer periphery 40 of the ring. A leveling ring attachment boss 44, a component attachment boss 46, and a cover attachment boss 48 extend from the inner periphery 42 of the leveling ring 26. Skirts 50 are formed in the ring body 33, with the skirts 50 extending inward of the inner periphery 42 of ring body 33. Ring body 33 has a substantially circular outer periphery 40 in order for outer periphery 40 to nest within the electrical enclosure 29 of the electrical box.

Figure 2:
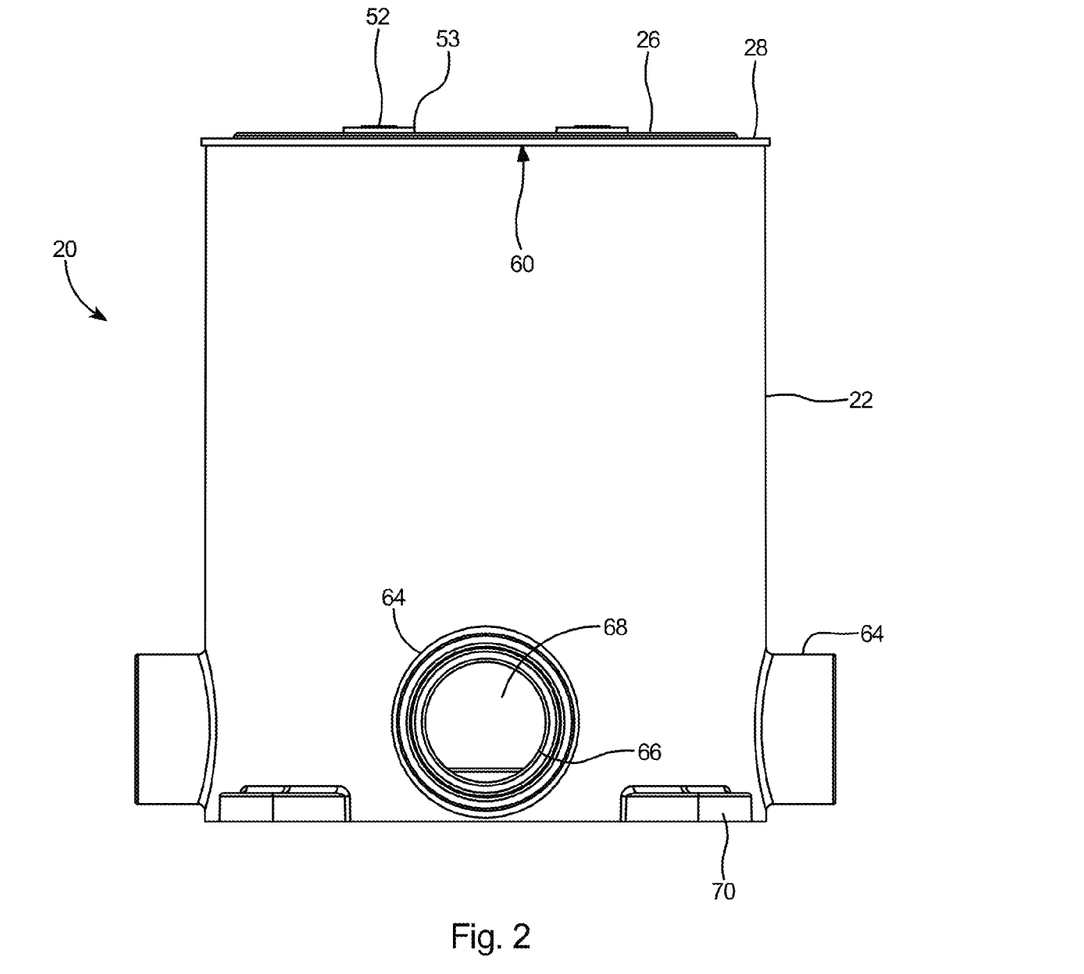
FIG. 2 is a side view of an electrical box that forms a portion of the electrical box assembly of FIG. 1.

Referring to FIGS. 1 and 2, leveling ring 26 is secured to electrical box 22 by mounting fasteners 52 secured through washers 53 and through apertures 54 of leveling ring attachment bosses 44 into bores 56 of mounting bosses 30 of electrical box. Electrical box 22 includes a substantially tubular sidewall 58 including a top rim 60, a bottom 62, and one or more hubs 64 extending from the sidewall 58 near the bottom 62 of the box. Each hub 64 includes a conduit seat 66 therein to enable the connection of electrical conduit (not shown) thereto and a cable opening 68 (see FIG. 5) to enable insertion of wiring leads (not shown) from the electrical cable into the electrical enclosure 29 of the electrical box. One or more feet 70 extend from the bottom 62 of the electrical box 22, and, as shown in FIG. 3, the feet 70 include apertures 72 therein for anchoring the electrical box to the earth, such as by rebar or similar fasteners (not shown).

Figure 3:
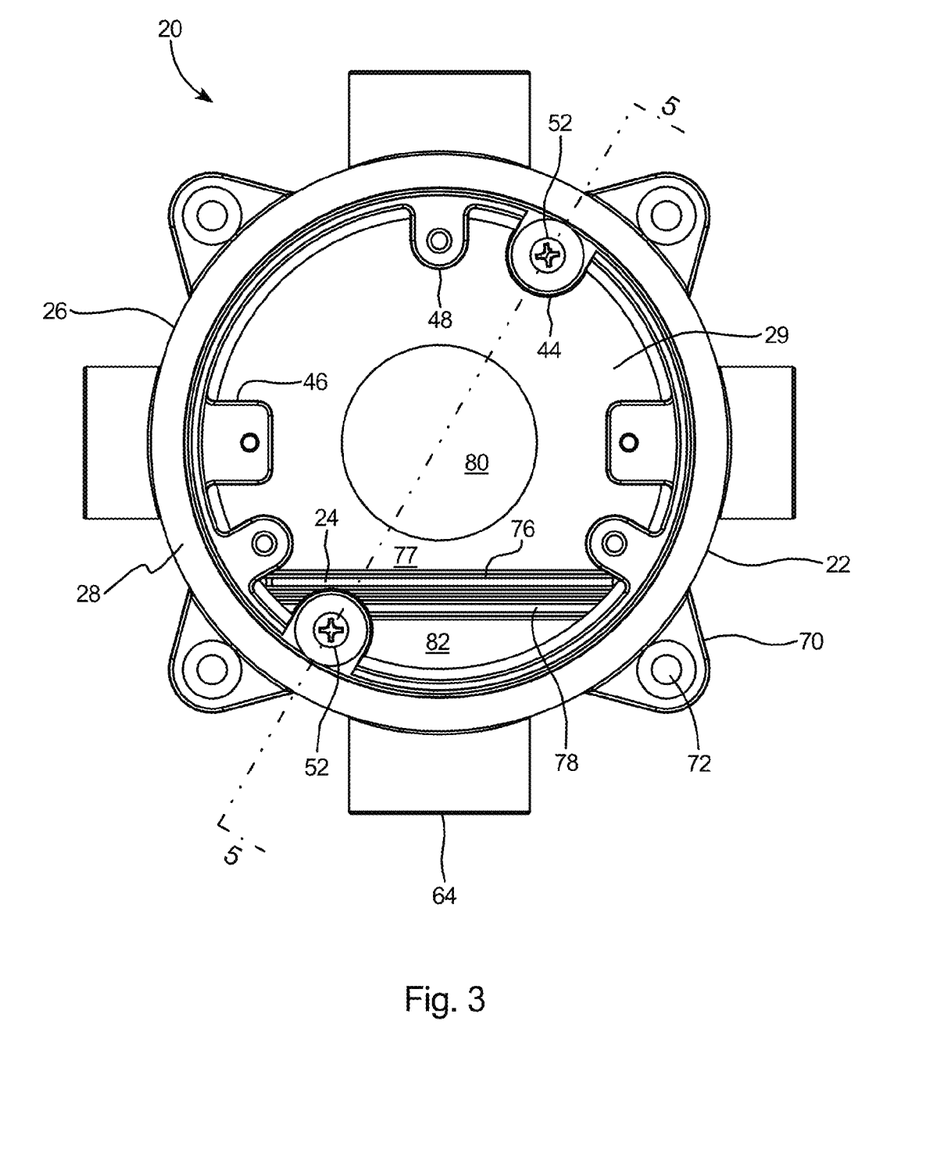
FIG. 3 is a top view of the electrical box assembly of FIG. 1, with the leveling ring secured to the electrical box.
Figure 4:
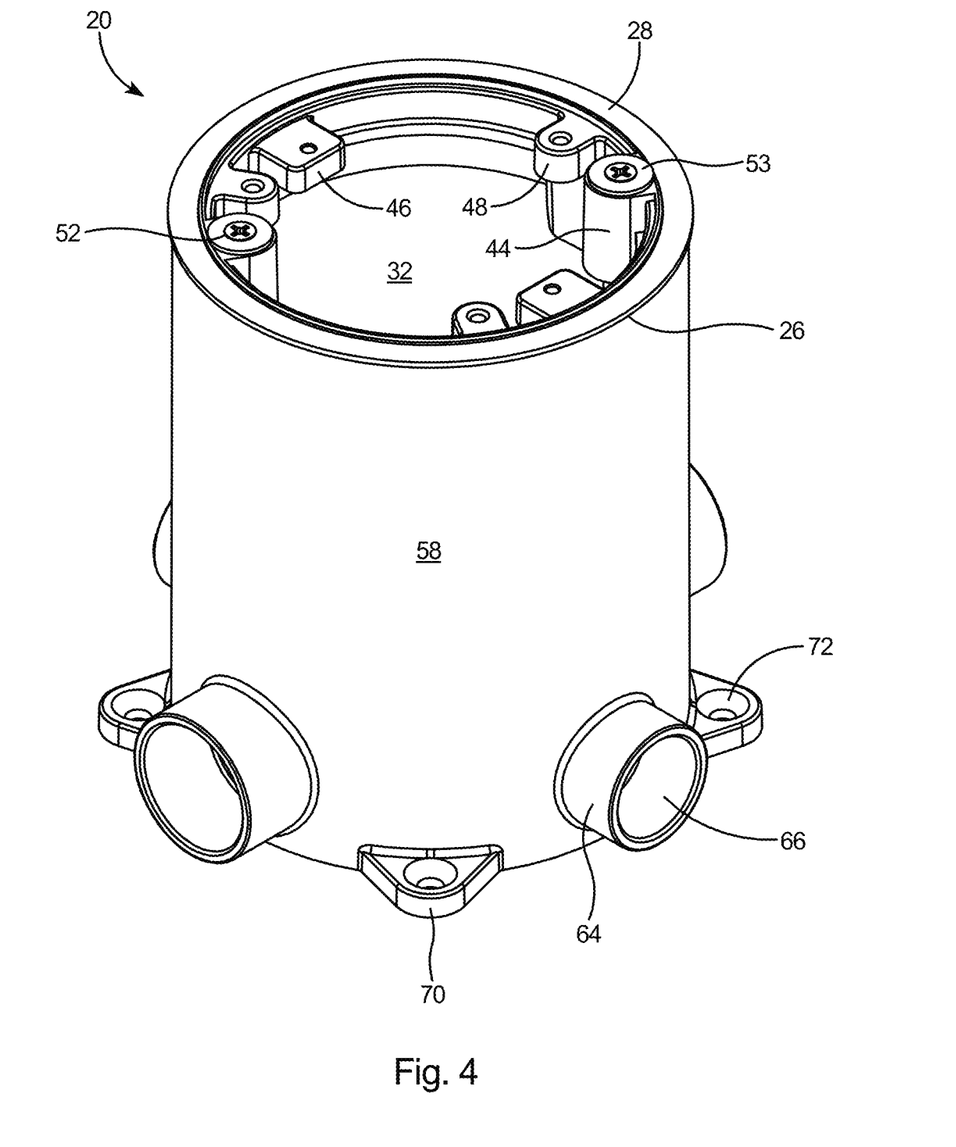
FIG. 4 is an isometric view of electrical box assembly of FIG. 1, with the leveling ring secured to the electrical box.

With reference to FIGS. 2 and 3, when secured to electrical box 22, flange 28 of leveling ring 26 is flush with the rim 60 of electrical box. Mounting fasteners 52 extend through leveling ring attachment bosses 44 of leveling ring 26 to secure the leveling ring to the electrical box 22. As shown in FIG. 3, two rails 76, typically molded into the interior of electrical box 22 and extending from the inner surface 32 of the sidewall 58 and along the bottom wall 77 of the box, form a channel 78 for accepting the optional slide member 24 for dividing the electrical box electrical enclosure 29 into a separate high voltage compartment 80 and low voltage compartment 82 if desired.

Figure 5:
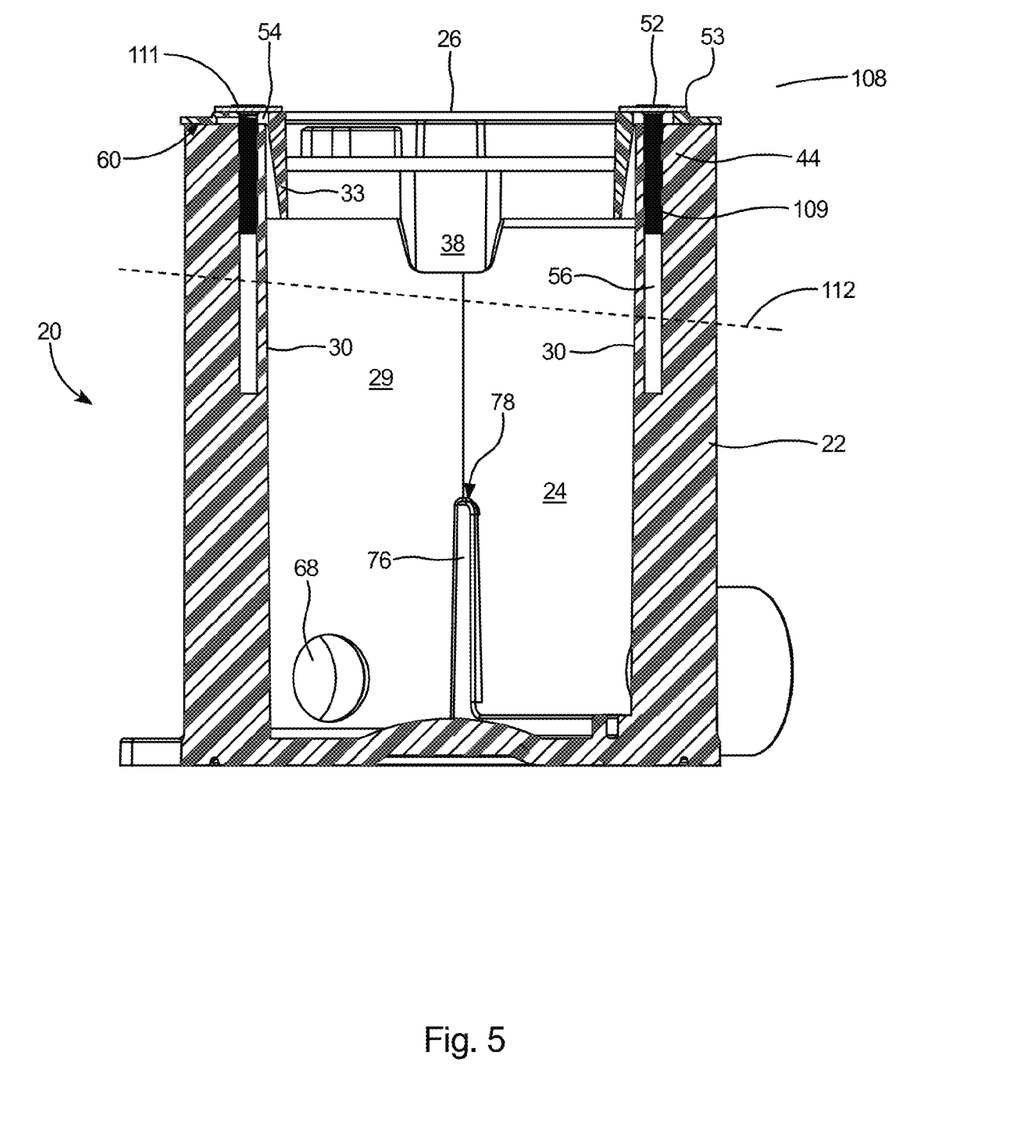
FIG. 5 is a sectional view of the electrical box assembly taken along line 5-5 of FIG. 3.
Figure 10:
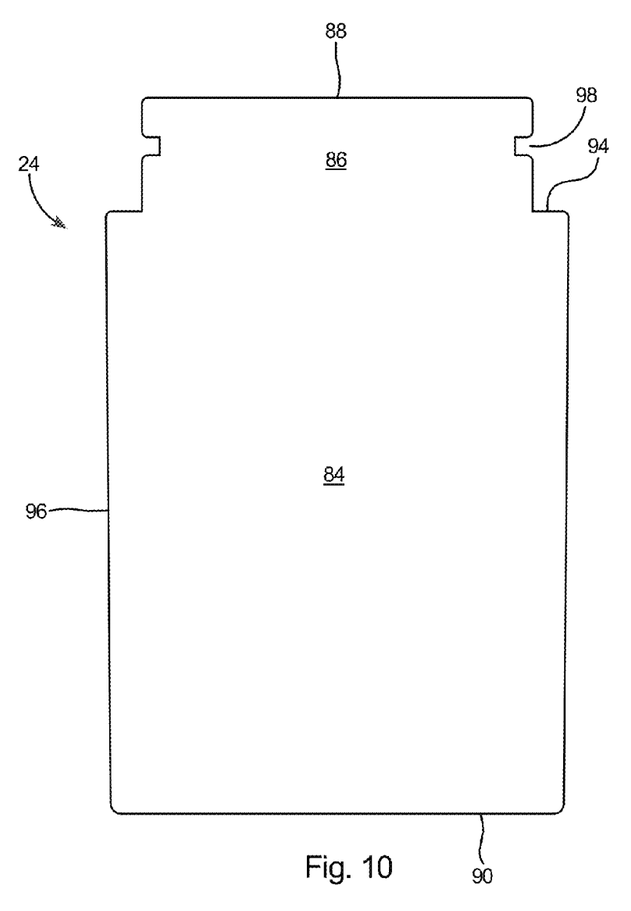
FIG. 10 is a front elevation view of a slide that forms a portion of the electrical box assembly of FIG. 1.
Figure 11:
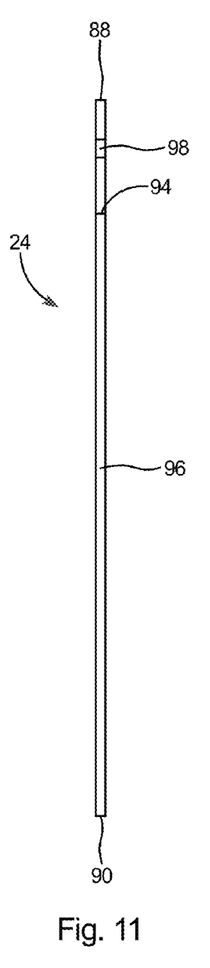
FIG. 11 is a side view of the slide.

As shown in FIGS. 10 and 11, the slide member 24 includes a body 84, a narrowed head portion 86, a top edge 88, a bottom edge 90, a shoulder 94, side edges 96, and notches 98 on opposing sides of the body 84. As shown in FIG. 5, when inserted into the channel 78, the slide member 24 extends substantially to the rim 60 of the electrical box 22.

Figure 8:
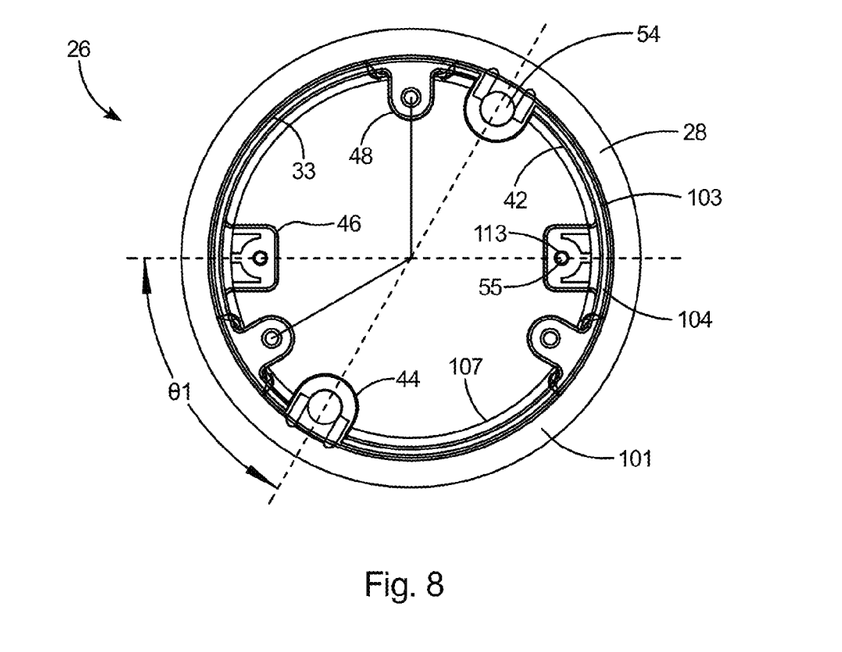
FIG. 8 is a top view of the leveling ring.
Figure 9:
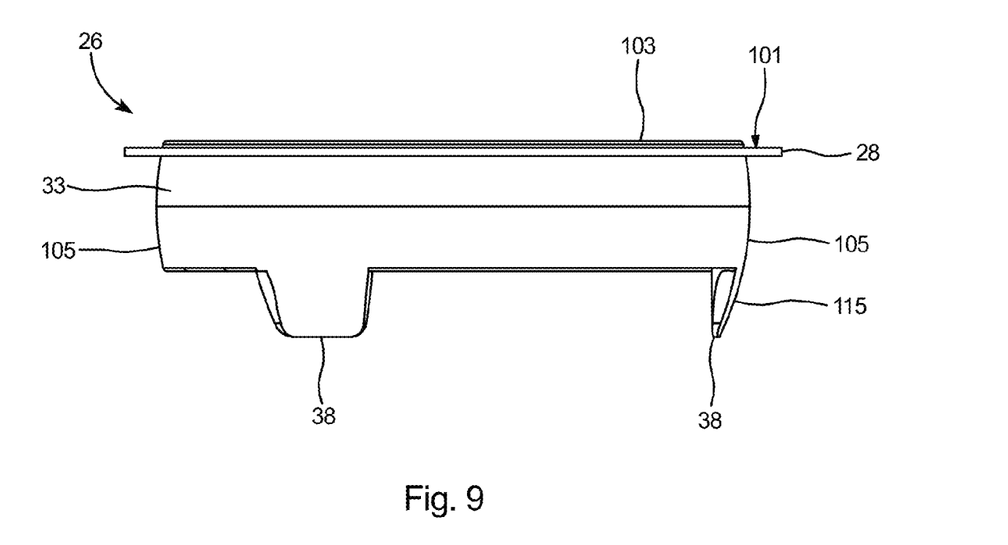
FIG. 9 is a side view of the leveling ring.

With reference to FIGS. 8 and 9, leveling ring 26 further includes an upper surface 101, a lip 103 extending upward from the upper surface inward of the flange 28 and defining a recessed area 104 inward of the flange 28, and an arcuate outer surface 105. A collar 107 extends inward around the entirety of the inner periphery 42 of the ring. Preferably there are two component attachment arms 46 extending inward from the inner periphery 42 of the ring, each of the component attachment arms 46 including a bore 55 therein. Preferably, the two component attachment arms 46 are arranged 180 degrees apart on opposing sides of the inner periphery. Arcuate outer surface 105 of ring facilitates a snug fit of the ring 26 within the sidewall 58 of the electrical box, and also enables slight tilting of the ring 26 with respect to the rim 60 (see FIG. 1) of the electrical box 22.

With reference to FIG. 8, most preferably there are three cover attachment bosses 48 extending from the inner periphery 42 of the leveling ring 26. The cover attachment bosses 48 are spaced 120 degrees apart around the inner periphery 42 of the leveling ring 26. Most preferably the leveling ring attachment arms 44 are spaced 180 degrees apart on the ring 26. Preferably, the angle θ1 between each leveling ring attachment arm 44 and the adjacent component attachment arm 46 is between 50 and 70 degrees, and most preferably angle θ1 is 60 degrees.

As shown in FIG. 5, mounting bosses 30 extend along the entire longitudinal or vertical length of the inner surface 32 of the electrical box 22. Preferably, the electrical box 22 and the integral mounting bosses 30 are molded in one piece of plastic. The mounting arrangement 108 for mounting leveling ring 26 to electrical box 22 includes the fasteners 52, washers 53, and the mounting bosses 30 with bores 56 therein. Most preferably, the washers 53 enable the threaded shanks 109 of fasteners 52 to pass through but prevent the heads 111 of the fasteners 52 from passing through. If, after the concrete is poured, the electrical box is not plumb, then the installer may cut off the electrical box with a saw or similar tool to create a top surface on the box 22 that is substantially flush with the concrete. Thus electrical box 22 and mounting bosses 30 can be cut at an angle, such as along line 112 in FIG. 5, to be flush with the concrete surface and the mounting arrangement 108 will self-adjust to mount leveling ring 26 flush with the newly cut rim 60 of the box 22. Thus the sidewall 58 and the integral mounting bosses 30 are cuttable along substantially any plane to bring the top rim 60 flush with the surface of the poured concrete. The term "cuttable" as used herein is defined as capable of being cut with a saw.

Referring to FIG. 8, most preferably each of the component attachment arms 46 includes a brass insert 113 pressed within each of the bores 55 therein in the arms. As shown in FIG. 9, the leg 38 of the leveling ring 26 includes an arcuate outer surface 115 that is coextensive with the arcuate outer surface arcuate outer surface 105 of the leveling ring 26.

With reference to FIG. 1, the material of construction of the electrical box 22, slide member 24, and leveling ring 26 is plastic. Most preferably, each of these elements are molded in one piece of plastic, with the brass inserts 113 pressed into bores 55 in the component attachment arms 46 of leveling ring 26 (see FIG. 8). Most preferably, the electrical box 22, slide member 24, and leveling ring 26 are each constructed of polyvinyl chloride (PVC).

Having thus described the invention with reference to a preferred embodiment, it is to be understood that the invention is not so limited by the description herein but is defined as follows by the appended claims. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments herein were chosen and described in order to best explain the principles of the invention and the practical application, and to enable others of ordinary skill in the art to understand the invention.

What is claimed is:

1. An electrical box assembly, comprising:
    an electrical box including a sidewall having an inner surface defining an electrical enclosure, said sidewall of said electrical box including an outer diameter;
    a mounting boss integrally molded with said sidewall and having a bore therein;
    a leveling ring including a ring body having an inner periphery, an outer periphery, and a flange extending from the outer periphery of the ring body;
    a slide for dividing said enclosure into a high voltage compartment and a low voltage compartment;
    a cover attachment boss on said leveling ring;
    a component attachment boss on said leveling ring; and
    said component attachment boss including a bore therein adapted for axial alignment with said bore in said mounting boss of said electrical box.

2. The electrical box assembly of claim 1, wherein said mounting boss extends the length of said electrical enclosure.

3. The electrical box assembly of claim 1, wherein said flange of said leveling ring includes a greater outer diameter than said outer diameter of said sidewall of said electrical box.

4. The electrical box assembly of claim 1, further comprising:
    a bottom wall on said electrical box; and
    a pair of parallel rails on said bottom wall.

5. The electrical box assembly of claim 1, wherein said slide is offset from a center of said bottom wall.

6. The electrical box assembly of claim 1, further comprising a leveling ring attachment boss on said ring body.

7. The electrical box assembly of claim 1, further comprising an upper surface on said leveling ring.

8. The electrical box assembly of claim 7, further comprising:
    a lip extending from said upper surface of said leveling ring; and
    said lip defining a recessed area on said leveling ring.

9. The electrical box assembly of claim 1, further comprising an arcuate outer surface on said outer periphery of said ring body.

10. The electrical box assembly of claim 1, further comprising a collar extending from said inner periphery of said ring body.

11. The electrical box assembly of claim 1, further comprising:
    a lower surface on said leveling ring; and
    a leg extending downward from said lower surface on said leveling ring.

12. The electrical box assembly of claim 11, further comprising an arcuate outer surface on said leg.

13. The electrical box assembly of claim 1, further comprising a hub extending from said sidewall of said electrical box.

14. The electrical box assembly of claim 13, wherein said hub is offset from said bottom of said electrical box.

15. The electrical box assembly of claim 14, further comprising a conduit seat and a cable opening on said hub.

16. The electrical box assembly of claim 1, further comprising:
    a foot extending from said electrical box; and
    an aperture in said foot.

17. The electrical box assembly of claim 8, wherein an upper surface of said cover attachment boss on said leveling ring is flush with said recessed area of said leveling ring.

18. An electrical box assembly, comprising:
    an electrical box including a sidewall having an inner surface defining an electrical enclosure, said sidewall of said electrical box including an outer diameter;
    a mounting boss integrally molded with said sidewall and having a bore therein;
    a leveling ring including a ring body having an inner periphery, an outer periphery, and a flange extending from the outer periphery of the ring body;
    a slide for dividing said enclosure into a high voltage compartment and a low voltage compartment;
    a cover attachment boss on said leveling ring;
    a skirt formed in the ring body; and
    said skirt extending inward of said inner periphery of said ring body.

19. An electrical box assembly, comprising:
    an electrical box including a sidewall having an inner surface defining an electrical enclosure, said sidewall of said electrical box including an outer diameter;
    a mounting boss integrally molded with said sidewall and having a bore therein;
    a leveling ring including a ring body having an inner periphery, an outer periphery, and a flange extending from the outer periphery of the ring body;
    a slide for dividing said enclosure into a high voltage compartment and a low voltage compartment;
    a cover attachment boss on said leveling ring;
    a narrowed head portion on said slide; and
    a notch on opposing sides of said narrowed head portion.

* * * * *